US012088085B2

(12) United States Patent
Kumar et al.

(10) Patent No.: US 12,088,085 B2
(45) Date of Patent: *Sep. 10, 2024

(54) OVERVOLTAGE PROTECTION CIRCUIT FOR A PMOS BASED SWITCH

(71) Applicants: STMICROELECTRONICS (ROUSSET) SAS, Rousset (FR); STMicroelectronics International N.V., Geneva (CH)

(72) Inventors: Manoj Kumar, Greater Noida (IN); Ravinder Kumar, Ambala (IN); Nicolas Demange, Saint-Maximin la Sainte Baume (FR)

(73) Assignees: STMICROELECTRONICS (ROUSSET) SAS, Rousset (FR); STMicroelectronics International N.V., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,737

(22) Filed: Jan. 20, 2023

(65) Prior Publication Data

US 2023/0155369 A1 May 18, 2023

Related U.S. Application Data

(63) Continuation of application No. 17/095,652, filed on Nov. 11, 2020, now Pat. No. 11,575,254.

(60) Provisional application No. 62/937,720, filed on Nov. 19, 2019.

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ........ H02H 3/20; H02H 1/0007; H02H 9/046; H02H 7/20; H03K 17/08
USPC .......................................................... 361/56
See application file for complete search history.

(56) References Cited

U.S. PATENT DOCUMENTS

| 6,920,026 | B2 | 7/2005 | Chen et al. |
| 7,760,476 | B2 | 7/2010 | Riviere et al. |
| 7,978,454 | B1 | 7/2011 | Pasqualini |
| 9,640,988 | B2 | 5/2017 | Ellis-Monaghan et al. |
| 10,153,768 | B1 * | 12/2018 | Micielli ............. H03K 17/6872 |
| 10,381,787 | B1 * | 8/2019 | Bodnaruk ................ H02H 3/20 |
| 2007/0069770 | A1 * | 3/2007 | Chen ................ H03K 19/00384 327/112 |

(Continued)

FOREIGN PATENT DOCUMENTS

| CN | 101944530 A | 1/2011 |
| CN | 105049027 A | 11/2015 |

(Continued)

*Primary Examiner* — Dharti H Patel

(74) *Attorney, Agent, or Firm* — Seed IP Law Group LLP

(57) ABSTRACT

An integrated circuit includes an overvoltage protection circuit. The overvoltage protection circuit detects overvoltage events at a pad of the integrated circuit. The overvoltage protection circuit generates a max voltage signal that is the greater of the voltage at the pad and a supply voltage of the integrated circuit. The overvoltage protection circuit disables a PMOS transistor coupled to the pad by supplying the max voltage signal to the gate of the PMOS transistor when an overvoltage event is present at the pad.

17 Claims, 8 Drawing Sheets

(56) References Cited

U.S. PATENT DOCUMENTS

| | | | |
|---|---|---|---|
| 2017/0365995 A1* | 12/2017 | Bahl | H02H 7/1213 |
| 2019/0128939 A1* | 5/2019 | O'Donnell | H02H 1/0007 |
| 2019/0207378 A1* | 7/2019 | Gan | H03K 19/017509 |

FOREIGN PATENT DOCUMENTS

| | | |
|---|---|---|
| CN | 109560533 A | 4/2019 |
| DE | 10128740 A1 | 3/2003 |
| EP | 0475057 A1 | 3/1992 |

* cited by examiner

700

702

RECEIVE A PAD VOLTAGE AT A PAD OF AN INTEGRATED CIRCUIT

704

GENERATE A MAX VOLTAGE SIGNAL THAT IS THE PAD VOLTAGE IF THE PAD VOLTAGE IS HIGHER THAN A SUPPLY VOLTAGE OF THE INTEGRATED CIRCUIT

706

SUPPLY THE MAX VOLTAGE SIGNAL TO A GATE TERMINAL OF A FIRST PMOS TRANSISTOR COUPLED TO THE PAD IF THE PAD VOLTAGE IS HIGHER THAN THE SUPPLY VOLTAGE

GENERATE A TRIGGER SIGNAL INDICATING AN OVERVOLTAGE EVENT AT A PAD OF AN INTEGRATED CIRCUIT

804

GENERATE A MAX VOLTAGE SIGNAL CORRESPONDING TO A GREATER OF THE PAD VOLTAGE AND THE SUPPLY VOLTAGE

806

DISABLE A PMOS TRANSISTOR COUPLED TO THE PAD BY PROVIDING THE MAX VOLTAGE SIGNAL TO A GATE TERMINAL OF THE PMOS TRANSISTOR RESPONSIVE TO THE TRIGGER SIGNAL

OVERVOLTAGE PROTECTION CIRCUIT FOR A PMOS BASED SWITCH

BACKGROUND

Technical Field

The present disclosure relates to the field of integrated circuits. The present disclosure relates more particularly to overvoltage protection for integrated circuits

Description of the Related Art

Integrated circuits include transistors. The transistors may have very small features that are liable to be damaged if subjected to high voltages. Additionally, integrated circuits typically include pads or terminals. In some cases, electrostatic charges can build up at a pad or terminal, resulting in an electrostatic discharge or other type of overvoltage event at the pad or terminal. If the transistors within the integrated circuits receive the electrostatic discharge or are otherwise subjected to high voltages from the pad or terminal, it is possible that the transistors will be damaged.

BRIEF SUMMARY

One embodiment is an integrated circuit including a pad, a PMOS transistor coupled to the pad, and a max voltage generator configured to generate a max voltage that is a greater of a pad voltage on the pad and a supply voltage of the integrated circuit. The integrated includes a gate shutoff circuit configured to disable the PMOS transistor by supplying the max voltage signal to a gate terminal of the PMOS transistor responsive to an overvoltage event at the pad.

One embodiment is a method including generating a trigger signal indicating an overvoltage event at a pad of an integrated circuit and generating a max voltage signal corresponding to a greater of the pad voltage and the supply voltage. The method includes disabling a PMOS transistor coupled to the pad by providing the max voltage signal to a gate terminal of the PMOS transistor responsive to the trigger signal.

One embodiment is a method including receiving a pad voltage at a pad of an integrated circuit and generating a max voltage signal that is the pad voltage if the pad voltage is higher than a supply voltage of the integrated circuit. The method includes supplying the max voltage signal to a gate terminal of a first PMOS transistor coupled to the pad if the pad voltage is higher than the supply voltage.

BRIEF DESCRIPTION OF THE SEVERAL VIEWS OF THE DRAWINGS

FIG. 7 is a flow diagram of a process for protecting an integrated circuit, according to an embodiment.

FIG. 8 is a flow diagram of a process for protecting an integrated circuit, according to an embodiment.

DETAILED DESCRIPTION

Figure 1:
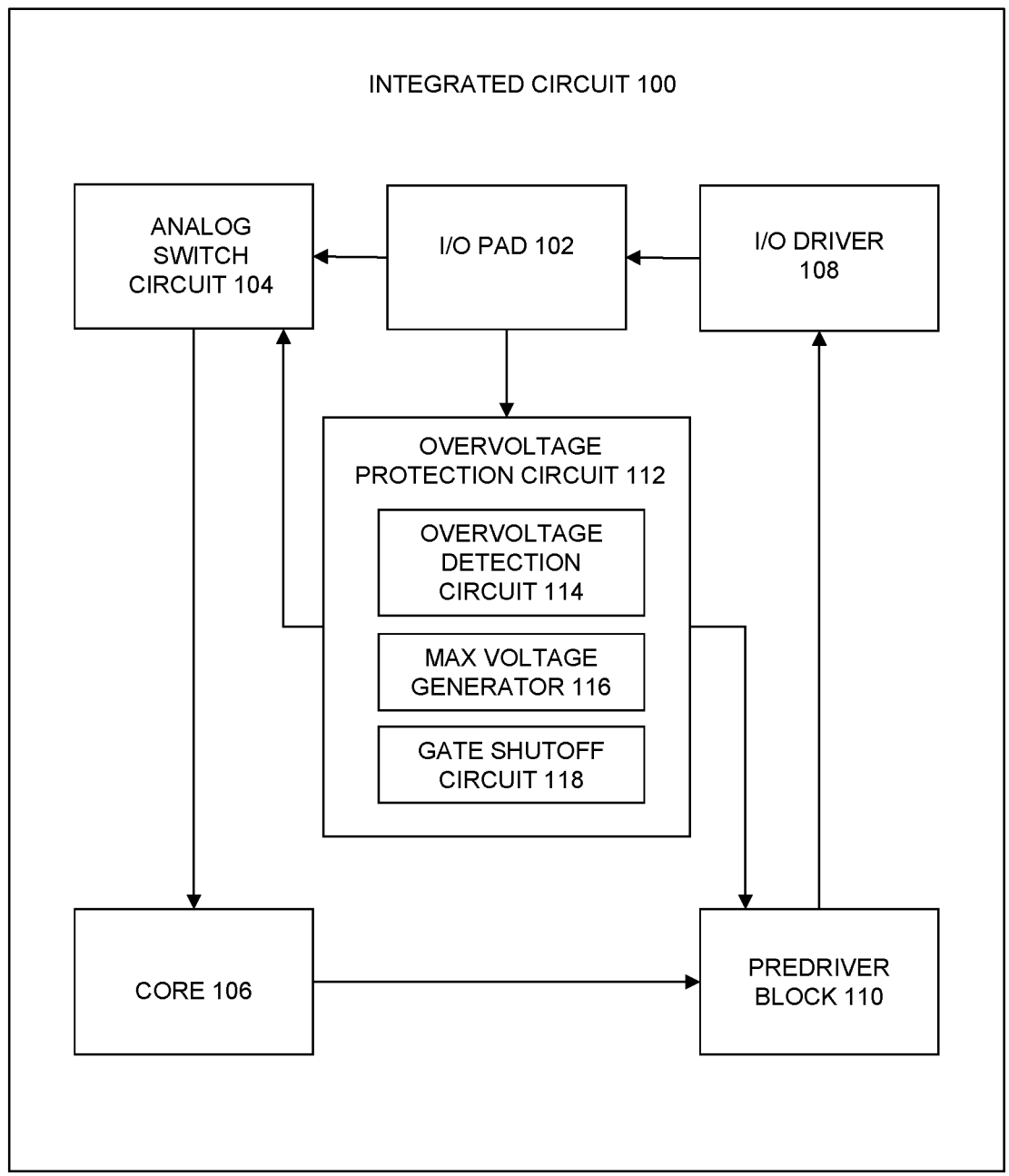
FIG. 1 is a block diagram of an integrated circuit, according to one embodiment.

FIG. 1 is a block diagram of an integrated circuit, according to one embodiment. The integrated circuit 100 includes an I/O pad 102, an analog switch circuit 104, a core 106, an I/O driver 108, a predriver block 110, and an overvoltage protection circuit 112.

The I/O pad 102 is a terminal of the integrated circuit 100. The I/O pad 102 receives data and other signals from devices external to the integrated circuit 100. The I/O pad also provides data and other signals to devices external to the integrated circuit 100.

The I/O pad 102 may be connected via wire bonding to a pin of a lead frame. Data may be provided to and received from the integrated circuit 100 via the pin. Other types of connections can be used to enable external devices to communicate with the I/O pad 102 without departing from the scope of the present disclosure.

The core 106 processes data received via the I/O pad 102. The core 106 can include processing circuitry. The core 106 can include circuitry that writes data to memory and that reads data from memory. The core 106 can include circuitry that execute software instructions.

The core 106 can include a large number of transistors coupled together in complex arrangements. The transistors cooperate to process data, to write data to memory, to read data from memory, and to execute software instructions. The transistors can be coupled together by metal interconnects formed in the integrated circuit 100.

Because there may be a large number of transistors performing a large number of tasks, it is possible that the transistors of the core 106 can utilize a large amount of power. The high-power usage can result in the generation of large amounts of heat. This can be problematic if the integrated circuit 100 is not able to safely dissipate the heat generated by the core 106.

In order to reduce the amount of heat generated by the transistors of the core 106, the transistors of the core 106 may operate on relatively low voltages. For example, the transistors of the core 106 may operate on voltages between 0.7 V and 1.1 V, though other voltages can be utilized without departing from the scope of the present disclosure. Smaller supply voltage values result in smaller amounts of power utilized by the transistors of the core 106.

The transistors of the core 106 may include relatively thin gate dielectrics. For example, the gate dielectrics of the transistors in the core 106 may include thicknesses between 10 Å and 20 Å. Other thicknesses for the gate dielectrics of the transistors in the core 106 can be utilized without departing from the scope of the present disclosure. As will be described in more detail below, because the transistors of the core 106 have relatively thin gate dielectrics, the transistors of the core 106 may be more susceptible to damage from overvoltage and electrostatic discharge events.

The analog switch circuit 104 facilitates the passing of input signals from the I/O pad 102 to the core 106. When the analog switch circuit 104 is enabled, signals can be passed from the I/O pad 102 to the core 106. The core 106 can receive the signals and execute various procedures including processing the input signals, storing in memory the data included in the input signals, executing instructions related to the input signals, or retrieving data in response to the input signals.

In one embodiment, the analog switch circuit 104 includes one or more PMOS transistors and one or more NMOS transistors. The NMOS and PMOS transistors can be enabled in order to pass signals from the I/O pad 102 to the core 106. The NMOS and PMOS transistors can be disabled in order to prevent signals from being passed from the I/O pad 102 to the core 106. As used herein, PMOS and NMOS transistors can include transistors that have conductive gate materials other than metal, and gate dielectric materials other than oxide.

The I/O driver 108 provides signals to the I/O pad 102. The signals can include data to be passed from the I/O pad 102 to a circuit or device external to the integrated circuit 100.

The I/O driver 108 can include one or more NMOS and PMOS transistors. The NMOS and PMOS transistors can be selectively operated to provide data to the I/O pad 102. By selectively enabling the NMOS and PMOS transistors, data can be provided to the I/O pad by modulating an output voltage of the I/O driver between a high logic value and a low logic value.

The predriver block 110 controls the I/O driver 108. The predriver block 110 can receive signals and data from the core 106. The predriver block 110 provides the data to the I/O pad 102 by selectively controlling the NMOS and PMOS transistors of the I/O driver 108 to modulate an output voltage provided by the I/O driver 108 to the I/O pad 102. The modulated voltage can correspond to the signals and data provided from the core 106 to the I/O pad 102.

The analog switch circuit 104, the I/O driver 108, and the predriver block 110 can operate at a supply voltage of the integrated circuit 100. The supply voltage of the integrated circuit 100 is higher than the relatively low supply voltage utilized by the core 106. The supply voltage of the integrated circuit 100 can include values between 2.5 V and 5.5 V, though other values can be utilized for the supply voltage of the integrated circuit 100 without departing from the scope of the present disclosure.

Because the analog switch circuit 104, the I/O driver 108, and the predriver block operate at a supply voltage that is higher than the core voltage supply, the transistors of the analog switch circuit 104, the I/O driver 108, and the pre-block driver 110 have gate dielectric thicknesses that are higher than the gate dielectric thicknesses of the transistors of the core 106. In one example, the transistors of the analog switch circuit 104, the I/O driver 108, and the pre-block driver 110 have gate dielectric thicknesses between 25 Å and 35 Å.

In standard operation, the I/O pad 102 receives voltages with values less than or equal to the supply voltage of the integrated circuit 100. However, due to the buildup of static electricity, or for other reasons, it is possible that voltages higher than the supply voltage of the integrated circuit 100 may appear at the I/O pad 102. When high voltages buildup at the I/O pad 102, it is possible that an electrostatic discharge may occur from the I/O pad 102. Due to the larger size of the transistors of the analog switch circuit 104, the I/O driver 108, and the predriver block 110, these transistors may be relatively unaffected by an electrostatic discharge from the I/O pad. To the contrary, the transistors of the core 106 may be much more susceptible to damage from electrostatic discharges due to the relatively thin gate dielectrics of the transistors of the core 106.

The integrated circuit 100 utilizes the overvoltage protection circuit 112 to protect the transistors of the core 106 and I/O driver 108 from overvoltage events appearing at the I/O pad 102. The overvoltage protection circuit 112 helps to ensure that electrostatic discharge will not pass from the I/O pad 102 to the core 106 in the event that a high voltage appears at the I/O pad 102. The overvoltage protection circuit 112 can detect high voltages at the I/O pad 102 and can generate signals to reliably disable transistors of the analog switch circuit 104 and the I/O driver 108. This can prevent electrostatic discharges from passing to the core 106 via the analog switch circuit 104 or the I/O driver 108.

In one embodiment, the overvoltage protection circuit 112 includes an overvoltage detector 114, a max voltage generator 116, and a gate shutoff circuit 118. The overvoltage detector 114, the max voltage generator 116, and the gate shutoff circuit 118 cooperate to protect the transistors of the core 106 from receiving electrostatic discharge from the I/O pad 102.

In one embodiment, the overvoltage detector 114 can detect when the voltage at the I/O pad 102 is higher than a supply voltage of the integrated circuit 100. The overvoltage detector 114 receives the supply voltage of the integrated circuit 100 and the voltage present at the I/O pad 102. If the voltage at the I/O pad 102 is higher than the supply voltage of the integrated circuit 100, the overvoltage detector 114 generates a trigger signal. The trigger signal indicates that the voltage at the I/O pad 102 is higher than the supply voltage of the integrated circuit 100. The overvoltage detector 114 provides the trigger signal to the gate shutoff circuit 118.

The max voltage generator 116 receives the supply voltage of the integrated circuit 100 and the voltage present at the I/O pad 102. The maximum voltage signal is the higher of the supply voltage of the integrated circuit 100 and the voltage at the I/O pad 102.

In one embodiment, the max voltage generator 116 compares the supply voltage to the pad voltage. The max voltage generator 116 generates the maximum voltage signal and supplies the maximum voltage signal to the gate shutoff circuit 118 circuit.

The gate shutoff circuit 118 receives the trigger signal from the overvoltage detector 114 when the overvoltage detector 114 generates the trigger signal. When the gate shutoff circuit receives the trigger signal from the overvoltage detector 114, the gate shutoff circuit 118 generates a shutoff signal. The gate shutoff circuit 118 provides a shutoff signal to one or more of the transistors of the analog switch circuit 104 and the I/O driver 108. The shutoff signal disables the one or more transistors of the analog switch circuit 104 and the I/O driver 108. Disabling the one or more transistors of the analog switch circuit 104 and the I/O driver 108 helps to prevent electrostatic discharge from the I/O pad 102 from passing to the core 106 via the one or more transistors of the analog switch circuit 104 and the I/O driver 108. In one embodiment, the overvoltage protection circuit 112 may apply the shutoff signals to either the transistors of the analog switch circuit 104 or to the transistors of the I/O driver 108.

In one embodiment, the shutoff signal includes a PMOS shutoff signal. The PMOS shutoff signal is provided to one or more PMOS transistors of the analog switch circuit 104 and the I/O driver 108. The PMOS shutoff signal disables the one or more PMOS transistors of the analog switch circuit 104 and the I/O driver 108.

In one embodiment, the PMOS shutoff signal is the maximum voltage signal received from the max voltage generator 116. The gate shutoff circuit 118 supplies the maximum voltage signal to the gate terminal of one or more of the transistors of the analog switch circuit 104 and the I/O driver 108. Because the shutoff signal is the maximum voltage present, the shutoff signal reliably disables a PMOS transistor when applied to the gate of the PMOS transistor. This is because the voltage on the source terminals of the PMOS transistors cannot be higher than the voltage on the gate terminals of the PMOS transistors when the maximum voltage signal is applied to the gate terminals of the PMOS transistors. Accordingly, the maximum voltage signal reliably disables PMOS transistors, thereby preventing electrostatic discharge from passing to the core 106 via the PMOS transistors.

In one embodiment, the analog switch circuit 104 include a single PMOS transistor and a single NMOS transistor. When the overvoltage detector 114 detects an overvoltage event at the I/O pad 102, the gate shutoff circuit 118 supplies the maximum voltage signal to the PMOS transistor of the analog switch circuit 104. This disables the PMOS transistor of the analog switch circuit 104 and prevents electrostatic discharge from flowing to the core 106 via the PMOS transistor. Alternatively, the analog switch circuit 104 can include multiple PMOS transistors. The maximum voltage signal can be supplied to the gate terminals of each of the PMOS transistors of the analog switch circuit 104. The maximum voltage signal can be supplied to selected PMOS transistors of the analog switch circuit 104 rather than all PMOS transistors of the analog switch circuit 104.

In one embodiment, the I/O driver 108 includes a single PMOS transistor and a single NMOS transistor. When the overvoltage detector 114 detects an overvoltage event at the I/O pad 102, the gate shutoff circuit 118 supplies the maximum voltage signal to the PMOS transistor of the I/O driver 108. This disables the PMOS transistor of the I/O driver 108. Alternatively, the I/O driver 108 can include multiple PMOS transistors. The maximum voltage signal can be supplied to the gate terminals of each of the PMOS transistors of the I/O driver 108. The maximum voltage signal can be supplied to selected PMOS transistors of the I/O driver 108 rather than to all PMOS transistors of the I/O driver 108.

In one embodiment, the overvoltage protection circuit 112 also generates a shutoff signal for one or more NMOS transistors of the analog switch circuit 104 and the I/O driver 108. The shutoff signal for the one or more NMOS transistors can be applied to the gates of the one or more NMOS transistors. The shutoff signal for the one or more NMOS transistors can include a low voltage signal selected to ensure that voltage at the gate terminals of the NMOS transistors is not higher than the voltage at the source terminals of the NMOS transistors.

Figure 2:
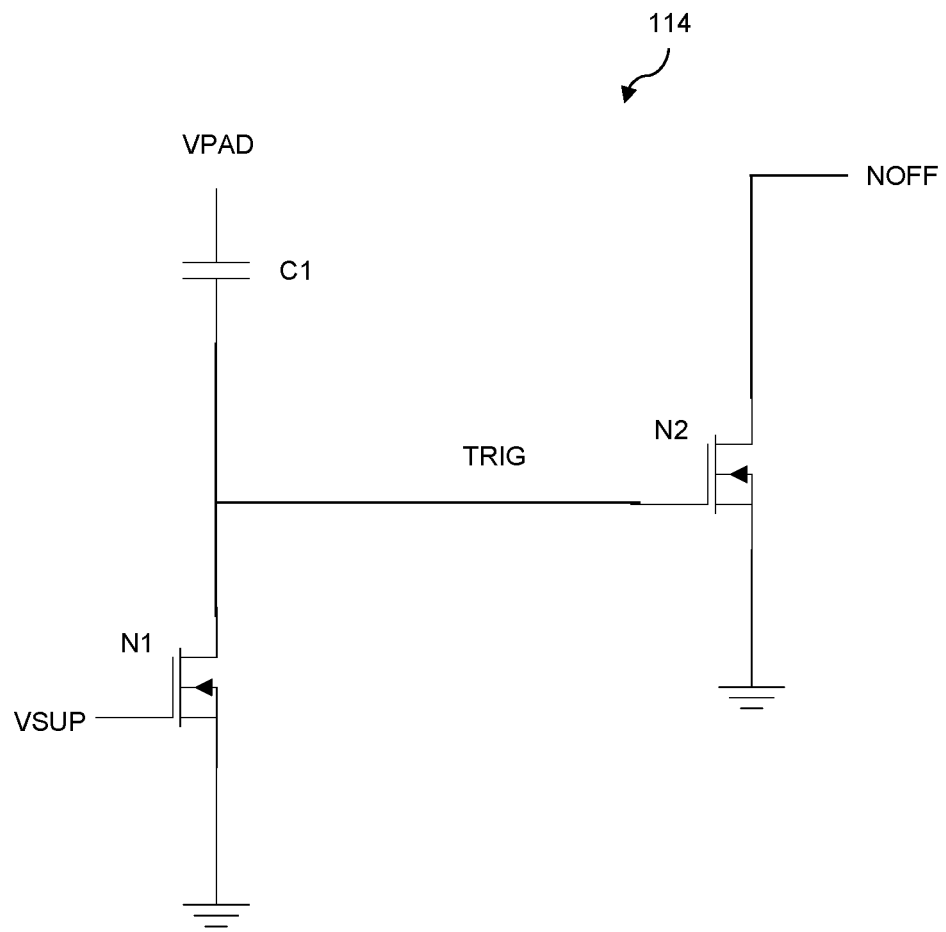
FIG. 2 is a schematic diagram of an over voltage detection circuit, according to one embodiment.

FIG. 2 is a schematic diagram of the overvoltage detector circuit 114, according to one embodiment. The overvoltage detector circuit 114 of FIG. 2 is one embodiment of the overvoltage detector circuit 114 of the overvoltage protection circuit 112 of FIG. 1. The overvoltage detector circuit 114 detects when a pad voltage VPAD on the I/O pad 102 is higher than a supply voltage VSUP of the integrated circuit 100.

The overvoltage detector 114 includes a capacitor C1, an NMOS transistor N1, and an NMOS transistor N2. The gate terminal of the transistor N1 receives the supply voltage VSUP. The source terminal of the transistor N1 is coupled to ground. A first terminal of the capacitor C1 is coupled to the pad voltage VPAD of the I/O pad 102. A second terminal of the capacitor C1 is coupled to the drain terminal of the transistor N1. The gate terminal of the transistor N2 is coupled to the drain terminal of the transistor N1 and the second terminal of the capacitor C1. The source terminal of the transistor N2 is coupled to ground. The drain terminal of the transistor N2 provides an NMOS shutoff signal NOFF, which will be described in more detail below. The drain terminal of the transistor N1 and the second terminal of the capacitor C1 provide the trigger signal TRIG, which will be described in more detail below.

Under standard conditions, the transistor N1 is conducting. This is because the gate terminal of the transistor N1 receives the supply voltage VSUP of the integrated circuit 100, while the source terminal of the transistor N1 receives ground. The result is that the gate to source voltage of the transistor N1 is positive and greater than the threshold voltage of the transistor N1. In this state, the drain terminal of the transistor N1 is coupled to ground via the source and channel of the transistor N1. Accordingly, under standard conditions, the trigger signal TRIG has a low value indicating that the pad voltage VPAD is not higher than the supply voltage VSUP.

In the case of an overvoltage event at the I/O pad 102, the voltage at the drain terminal N1 momentarily goes very high. This means that the trigger signal TRIG has a high value. A high value of the trigger signal TRIG indicates that the pad voltage VPAD is higher than the supply voltage VSUP.

In one embodiment, the capacitor C1 has a value that enables the transmission of a transient high-voltage from the I/O pad to the drain terminal of the transistor N1. Electrostatic discharge events typically arise rapidly. This is similar to a high-frequency signal being passed from the I/O pad 102 to the capacitor C1. In this case, the capacitor C1 acts as a high-pass filter that passes a rapidly changing voltage from the I/O pad 102 to the drain terminal of the transistor N1. The result is that the drain terminal of the transistor N1 momentarily goes to a value higher than the value of the supply voltage VSUP. This corresponds to the trigger signal TRIG going to a high-value, indicating that the pad voltage VPAD of the I/O pad 102 is higher than the supply voltage VSUP.

In one embodiment, the capacitor C1 has a capacitance between 1 pF and 1 nF. Alternatively, the capacitor C1 can have capacitance values outside this range without departing from the scope of the present disclosure.

The overvoltage detector circuit 114 of FIG. 2 is one embodiment of a circuit that can detect high voltages at the I/O pad 102. Those of skill in the art will recognize, in light of the present disclosure, that other circuit configurations can be utilized to detect high-voltages at the I/O pad 102 and to generate trigger signals indicating the presence of high voltages at the I/O pad 102 without departing from the scope of the present disclosure.

Figure 3:
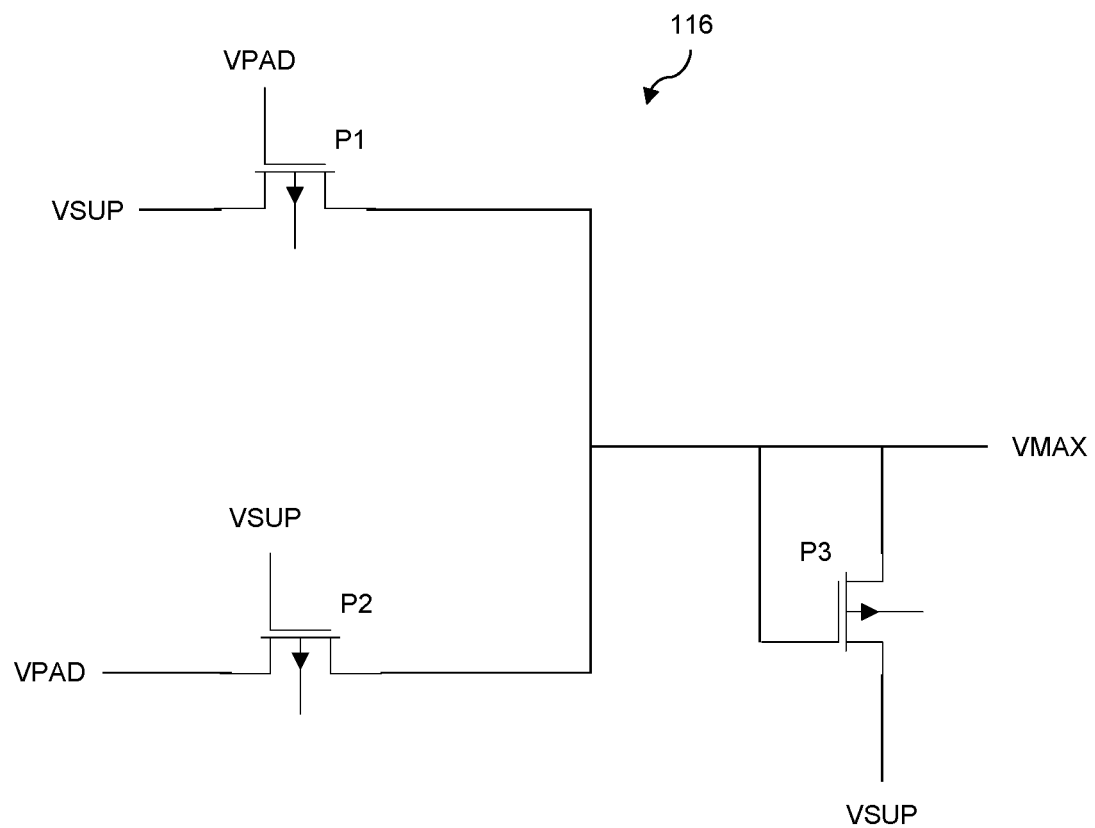
FIG. 3 is a schematic diagram of a max voltage generator, according to one embodiment.

FIG. 3 is a schematic diagram of the max voltage generator 116, according to one embodiment. The max voltage generator 116 of FIG. 3 is one embodiment of the max voltage generator 116 of the overvoltage protection circuit 112 of FIG. 1. Other embodiments for a max voltage generator 116 can be utilized without departing from the scope of the present disclosure.

The max voltage generator 116 receives as input signals the supply voltage VSUP and the pad voltage VPAD on the I/O pad 102. The max voltage generator 116 outputs a max voltage signal VMAX corresponding to the higher voltage between VSUP and the VPAD. Accordingly, the max voltage generator 116 effectively compares the supply voltage VSUP to the pad voltage VPAD and outputs the higher voltage between VPAD and VSUP.

The max voltage generator 116 includes a PMOS transistor P1, a PMOS transistor P2, and a PMOS transistor P3. The PMOS transistors P1-P3 are coupled together and receive voltage signals on the terminals such that the PMOS transistors P1-P3 output VMAX.

The PMOS transistor P1 receives on a source terminal the supply voltage VSUP. The PMOS transistor P1 receives the pad voltage VPAD on its gate terminal. The PMOS transistor P1 receives voltage VMAX on its body terminal. The drain terminal of the PMOS transistor P1 is coupled to the drain terminal of the PMOS transistor P2 and to the source and gate terminals of the PMOS transistor P3. The drain terminal of the PMOS transistor P1 outputs VMAX. The body terminal connections of the various transistors are not shown in FIGS. 3-6, but are described herein.

The PMOS transistor P2 receives the pad voltage VPAD on a source terminal. The PMOS transistor P2 receives the supply voltage VSUP on its gate terminal. The PMOS transistor P2 receives the voltage VMAX on its body terminal.

The PMOS transistor P3 receives on its gate and source terminals VMAX. The PMOS transistor P3 receives on its drain terminal VSUP. The PMOS transistor P3 receives the voltage VMAX on its body terminal.

If VPAD is greater than VSUP, then the PMOS transistor P1 has a positive gate to source voltage. In this state, the PMOS transistor P1 is disabled. If VPAD is greater than VSUP then the PMOS transistor P2 has a negative gate to source voltage and the PMOS transistor P2 is enabled. When the PMOS transistor P2 is enabled, then VPAD is supplied on the drain terminal of the PMOS transistor P2. In this case, VPAD is applied as VMAX because VPAD is greater than VSUP.

If VSUP is greater than VPAD, then the PMOS transistor P2 has a positive gate to source voltage and the PMOS transistor P2 is disabled. If VSUP is greater than VPAD, then the PMOS transistor P1 has a negative gate to source voltage. In this state, the PMOS transistor P1 is enabled. When the PMOS transistor P1 is enabled, then VSUP is supplied on the drain terminal of the PMOS transistor P1. In this case, VSUP is supplied as VMAX because VSUP is greater than VPAD.

The max voltage generator 116 supplies VMAX to the gate shutoff circuit 118. The gate shutoff circuit 118 can then disable one or more PMOS transistors by applying VMAX to the gate terminals of the one or more PMOS transistors.

The max voltage generator 116 in FIG. 3 is one embodiment of a circuit that can output a voltage VMAX corresponding to the higher of VPAD and VSUP. Those of skill in the art will recognize, in light of the present disclosure, that other circuit configurations can be utilized to generate VMAX without departing from the scope of the present disclosure.

Figure 4:
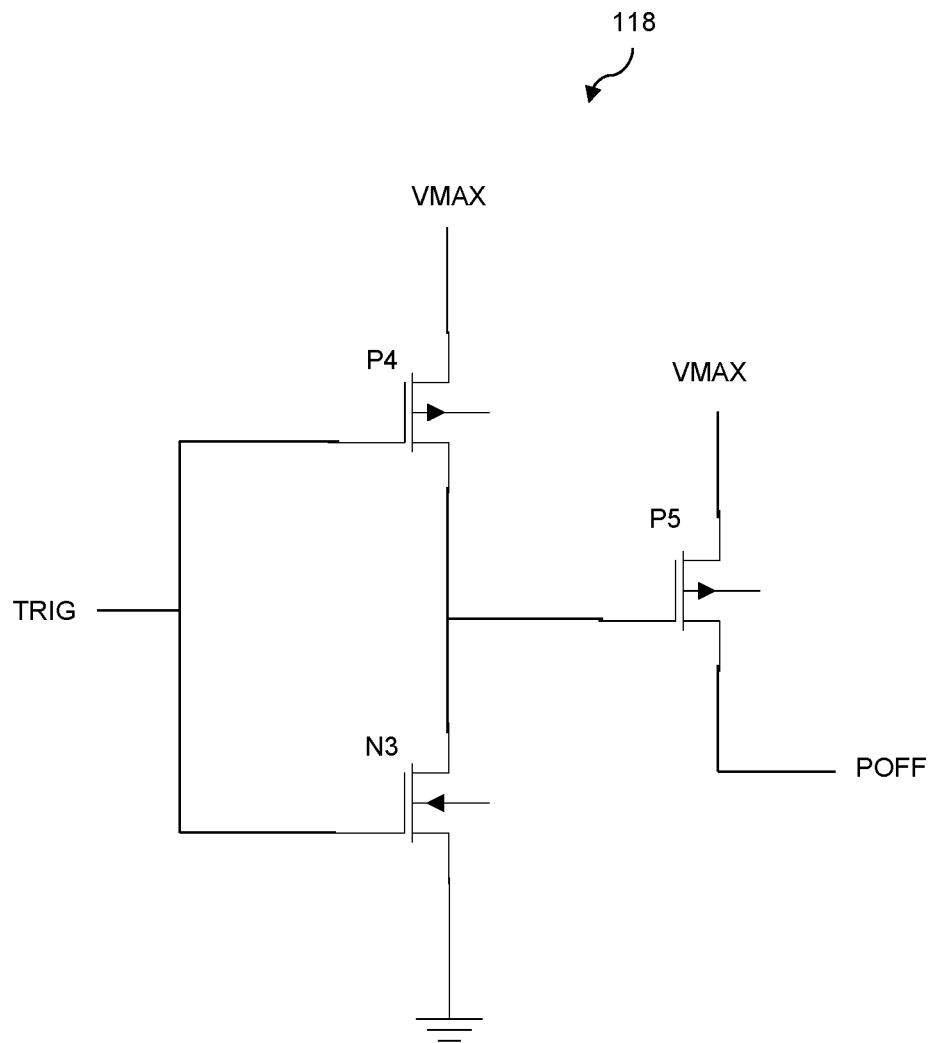
FIG. 4 is a schematic diagram of a gate shutoff circuit, according to one embodiment.

FIG. 4 is a schematic diagram of the gate shutoff circuit 118, according to one embodiment. The gate shutoff circuit 118 shown in FIG. 4 is one embodiment of the gate shutoff circuit 118 of the overvoltage protection circuit 112 of FIG. 1. Other configurations of a gate shutoff circuit 118 can be utilized without departing from the scope of the present disclosure.

The gate shutoff circuit 118 of FIG. 4 receives, as input signals, the trigger signal TRIG and the max voltage signal VMAX. The gate shutoff circuit 118 applies VMAX to the gate terminals of one or more PMOS transistors to disable the PMOS transistors if the trigger signal indicates that an overvoltage event is present at the I/O pad 102.

The gate shutoff circuit 118 includes an NMOS transistor N3, a PMOS transistor P4, and a PMOS transistor P5. The transistors N3, P4, and P5 are coupled together to generate the gate shutoff signal POFF.

The PMOS transistor P4 and the NMOS transistor N3 are coupled together as an inverter. The input of the inverter is the trigger signal TRIG. The output of the inverter is coupled to the gate of the PMOS transistor P5. More particularly, the gate terminals of the PMOS transistor P4 and the NMOS transistor N3 receive the trigger signal TRIG. The source terminal of the PMOS transistor P4 receives VMAX. The source terminal of the NMOS transistor N3 receives ground. The body of the PMOS transistor P4 is coupled to VMAX. The body of the NMOS transistor N3 is coupled to ground. The gate of the PMOS transistor P5 is coupled to the drain terminals of the PMOS transistor P4 and the NMOS transistor N3. The source terminal of the PMOS transistor P5 is coupled to VMAX. The drain terminal of the PMOS transistor P5 supplies POFF.

When an overvoltage event is present at the I/O pad 102, TRIG has a high value. When TRIG has a high value, the PMOS transistor P4 is disabled and the NMOS transistor N3 is enabled. With the NMOS transistor N3 enabled, the gate terminal of the PMOS transistor P5 is coupled to ground via the enabled NMOS transistor N3. When the gate terminal of the PMOS transistor P5 receives ground, the gate to source voltage of the PMOS transistor P5 is negative and the PMOS transistor P5 is enabled. When the PMOS transistor P5 is enabled, the drain terminal of the PMOS transistor P5 is at VMAX. Accordingly, when the trigger signal TRIG is high, POFF is VMAX. POFF can then be utilized to disable one or more PMOS transistors.

When there is not an overvoltage event at the I/O pad 102, TRIG has a low value. When TRIG has a low value, the PMOS transistor P4 is enabled and the NMOS transistor N3 is disabled. With the PMOS transistor P4 enabled, the gate terminal of the PMOS transistor P5 is coupled to VMAX via the enabled PMOS transistor P4. When the gate terminal of the PMOS transistor P5 is coupled to VMAX, the PMOS transistor P5 is disabled and the drain terminal of the PMOS transistor P5 does not receive VMAX. The drain terminal of the PMOS transistor P5 is floating. Alternatively, additional circuitry can be utilized to ensure that POFF has a low value. The low value POFF will not be utilized to disable the one or more PMOS transistors.

In one example, the gate shutoff circuit 118 can provide VMAX to the gate terminals of one or more PMOS transistors of the analog switch circuit 104. In one example, the gate shutoff circuit 118 can provide VMAX to the gate terminals of one or more PMOS transistors included in the I/O driver 108. In one example, the gate shutoff circuit 118 can provide VMAX to one or more PMOS transistors of the analog switch circuit 104 and to one or more PMOS transistors of the I/O driver 108.

In one embodiment, the gate shutoff circuit 118 can provide VMAX to an intervening circuit that controls either the analog switch circuit 104 or the I/O driver 108. The intervening circuit can then apply VMAX to the gate terminals of one or more PMOS transistors in the analog switch circuit 104 and/or the I/O driver 108. In one example, the gate shutoff circuit 118 provides VMAX to the predriver block 110. The predriver block 110 then supplies VMAX to one or more gate terminals of the I/O driver 108. In one embodiment, the gate shutoff circuit 118 can provide VMAX to another circuit that controls the analog switch circuit 104 in order to disable the analog switch circuit 104 in the event of an overvoltage situation on the I/O pad 102.

The gate shutoff circuit 118 of FIG. 4 is one embodiment of a gate shutoff circuit that can be utilized to generate a gate shutoff signal POFF configured to shut off one or more PMOS transistors in the event of an overvoltage situation at the I/O pad 102. Those of skill in the art will recognize, in light of the present disclosure, that other configurations of a gate shutoff circuit 118 can be utilized without departing from the scope of the present disclosure.

Figure 5:
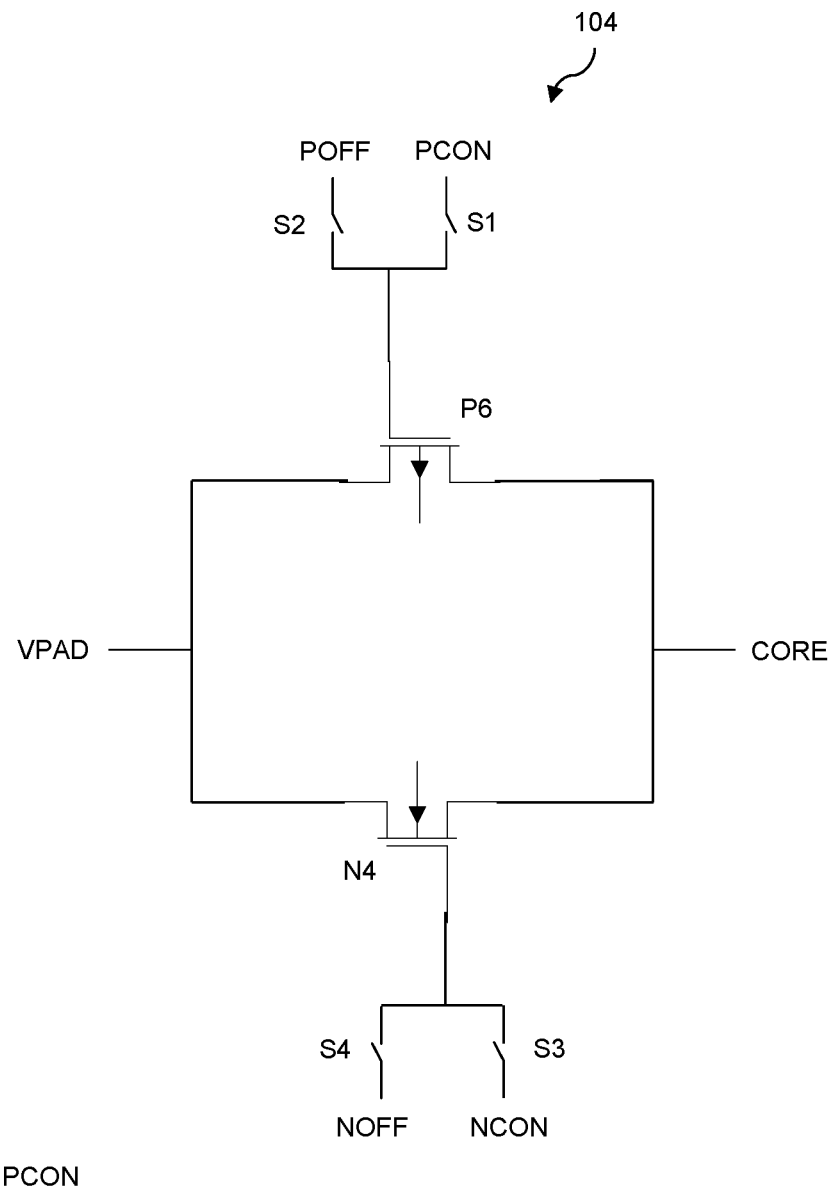
FIG. 5 is a schematic diagram of an analog switch circuit, according to one embodiment.

FIG. 5 is a schematic diagram of an analog switch circuit 104, according to one embodiment. The analog switch circuit 104 is coupled between VPAD and the core 106. The analog switch circuit 104 passes signals received at the I/O pad 102 to the core 106. The signals can include digital data signals or analog signals.

The analog switch circuit 104 include a PMOS transistor P6, an NMOS transistor N4, and switches S1-S4. The source terminals of the PMOS transistor P6 and the NMOS transistor N4 are coupled to the I/O pad 102 and receive the pad voltage VPAD. The drain terminals of the PMOS transistor P6 and the NMOS transistor N4 are coupled to the core 106. The gate terminal of the PMOS transistor P6 receives either a PMOS control signal PCON or the gate shutoff signal POFF, depending on the state of the switches S1-S2. The gate terminal of the NMOS transistor N4 receives either an NMOS control signal NCON or the gate shutoff signal NOFF, depending on the state of the switches S3-S4. The body of the PMOS transistor P6 is coupled to VSUP. The body of the NMOS transistor N4 is coupled to ground.

In one embodiment, the switches S1-S4 are controlled by the trigger signal TRIG. When an overvoltage situation is not present at the I/O pad 102, TRIG has a low value. The switches S1 and S3 are closed and the switches S2 and S4 are open. In this state, the gate terminal of the PMOS transistor P6 receives the control signal PCON and the gate terminal of the NMOS transistor N4 receives the control signal NCON.

In an overvoltage situation, the trigger signal TRIG has a high value. The switches S1 and S3 are open and the switches S2 and S4 are closed. In this state, the gate terminal of the PMOS transistor P6 receives the gate shutoff signal POFF and the gate terminal of the NMOS transistor N4 receives the gate shutoff signal NOFF. The switches S2 and S4 are only closed during an overvoltage situation. In standard operation of the integrated circuit 100, the switches S2 and S4 are open, while the switches S1 and S3 are closed. Other circuit configurations can be utilized to selectively apply the control signals or the gate shutoff signals to the gate terminals of the transistors P6 and N4 without departing from the scope of the present disclosure.

In one embodiment, the PMOS transistor P6 and the NMOS transistor N4 have gate dielectrics that are relatively thick compared to the gate dielectrics of the transistors in the core 106. Accordingly, the PMOS transistor P6 and the NMOS transistor N4 can be subjected to higher voltages without being damaged than can the transistors of the core 106. In one example, the gate dielectrics of P6 and N4 have values between 25 Å and 35 Å. In one example, the gate dielectrics of the transistors in the core 106 have thicknesses between 10 Å and 20 Å.

In one embodiment, when the PMOS transistor P6 and the NMOS transistor N4 are intended to pass signals from the I/O pad 102 to the core 106, NCON has a value of VSUP and PCON has a value of GND. This enables low and high signals at the I/O pad 102 to pass through either the PMOS transistor P6 or the NMOS transistor N4, depending on the value of the signals. When the PMOS transistor P6 and the NMOS transistor N4 are intended to not pass signals from the I/O pad 102 to the core 106, the NMOS transistor NCON has a value of ground and PCON has a value of VSUP, thereby disabling both the PMOS transistor P6 and the NMOS transistor N4.

In the case of an overvoltage event at the I/O pad 102, VMAX will be supplied to the gate terminal of the PMOS transistor P6. The gate shutoff signal POFF has the value VMAX in an overvoltage situation. The high value of the trigger signal TRIG results in POFF being applied to the gate terminal of the PMOS transistor P6. This disables the transistor P6 and prevents the overvoltage at the I/O pad 102 from being passed to the core 106 via the PMOS transistor P6.

In one embodiment, as described in relation to FIG. 2, the gate shutoff signal NOFF, having the value ground, can be supplied to the gate of the NMOS transistor N4 in the case of an overvoltage event at the I/O pad 102. This is because a high value of TRIG will result in NOFF being forced to ground. The high value of the trigger signal TRIG also results in NOFF being applied to the gate terminal of N4. This disables the NMOS transistor N4 and prevents the voltage at the I/O pad 102 from passing to the core 106 via the NMOS transistor N4.

Figure 6:
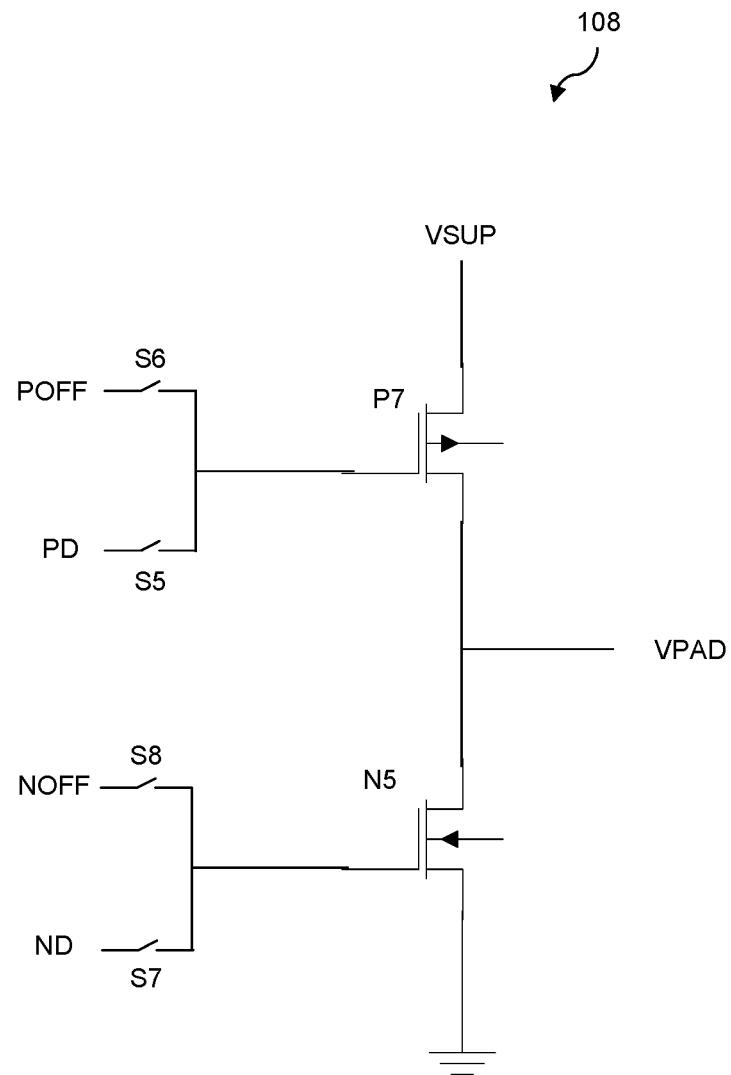
FIG. 6 is a schematic diagram of an I/O driver, according to one embodiment.

FIG. 6 is a schematic diagram of the I/O driver 108, according to one embodiment. The I/O driver 108 of FIG. 6 is one embodiment of the I/O driver 108 of FIG. 1. Other configurations of the I/O driver 108 can be utilized without departing from the scope of the present disclosure.

The I/O driver 108 drives data signals to the I/O pad 102. The data signals can be received from the core 106 or from other sources. The predriver block 110 can control the I/O driver 108.

The I/O driver 108 includes a PMOS transistor P7, an NMOS transistor N5, and switches S5-S8. The PMOS transistor P7 receives at its gate terminal either a PMOS driver signal PD or the gate shutoff signal POFF. The NMOS transistor N5 receives at its gate terminal either an NMOS driver signal ND or the gate shutoff signal NOFF. The source terminal of the PMOS transistor P7 is coupled to VSUP. The source terminal of the NMOS transistor N5 is coupled to ground. The drain terminals of the PMOS transistor P7 and the NMOS transistor N5 are coupled to the I/O pad 102. The body terminal of the PMOS transistor P7 is coupled to VSUP. The body terminal of the NMOS transistor N5 is coupled to ground.

In one embodiment, the switches S5-S8 are controlled by the trigger signal TRIG. When an overvoltage situation is not present, TRIG has a low value. The switches S5 and S7 are closed and the switches S6 and S8 are open. In this state, the gate terminal of the PMOS transistor P7 receives the gate drive signal PD and the gate terminal of the NMOS transistor N5 receives the gate drive signal ND.

In an overvoltage situation the trigger signal TRIG has a high value. The switches S5 and S7 are open and the switches S6 and S8 are closed. In this state, the gate terminal of the PMOS transistor P7 receives the gate shutoff signal POFF and the gate terminal of the NMOS transistor N5 receives the gate shutoff signal NOFF. The switches S6 and S8 are only closed during an overvoltage situation. In standard operation of the integrated circuit 100, the switches S6 and S8 are open, while the switches S5 and S7 are closed. Other circuit configurations can be utilized to selectively apply the gate drive signals or the gate shutoff signals to the gate terminals of the transistors P7 and N5 without departing from the scope of the present disclosure.

When a high data value is to be supplied to the I/O pad 102 via the I/O driver 108, PD and ND are forced to a low logic value, or ground. This enables the PMOS transistor P7 and disables the NMOS transistor N5. VSUP is then supplied to the I/O pad via the enabled PMOS transistor P7, representing a high logic value.

When a low data value is to be supplied to the I/O pad 102 via the I/O driver 108, PD and ND are forced to a high logic value or VSUP. This disables the PMOS transistor P7 and enables the NMOS transistor N5. Ground is then supplied to the I/O pad 102 via the enabled NMOS transistor N5, representing a low logic value.

In one embodiment, the PMOS transistor P7 and the NMOS transistor N5 have gate dielectrics that are relatively thick compared to the gate dielectrics of the transistors in the core 106. Accordingly, the PMOS transistor P7 and the NMOS transistor N5 can be subjected to higher voltages without being damaged then can the transistors of the core 106. In one example, the gate dielectrics of P7 and N5 have values between 25 Å and 35 Å.

In the case of an overvoltage event at the I/O pad 102, POFF will be supplied to the gate terminal of the PMOS transistor P7. POFF has the value of VMAX during the overvoltage event. The application of VMAX to the gate terminal of the transistor P7 disables the transistor P7 and prevents the overvoltage at the I/O pad 102 from being passed to the core 106 via the PMOS transistor P7.

In one embodiment, as described in relation to FIG. 2, ground can be supplied to the gate of the NMOS transistor N5 in the case of an overvoltage event at the I/O pad 102. This is because a high value of the trigger signal TRIG will result in NOFF being forced to ground. The high value of the trigger signal TRIG results in NOFF being applied to the gate terminal of N5. Thus, in the case of an overvoltage event that the I/O pad 102, ground is supplied to the gate terminal of the NMOS transistor N5, thereby disabling the NMOS transistor N4 and preventing the voltage at the I/O pad 102 from passing to the core 106 via the NMOS transistor N5.

While the figures and description have been directed primarily to an embodiment in which an I/O pad is subject to an overvoltage event, the principles of the present disclosure can apply to other pads or terminals of an integrated circuit. In particular, an overvoltage protection circuit can detect an overvoltage event at a pad or terminal of an integrated circuit, can generate a max voltage signal corresponding to a maximum of a pad/terminal voltage and the supply voltage, and can disable a PMOS transistor by applying the max voltage to the gate of the PMOS transistor. Likewise, a shutoff signal can be applied to an NMOS transistor in response to detecting an overvoltage event at the pad or terminal of the integrated circuit.

FIG. 7 is a flowchart of a process 700 for protecting an integrated circuit, according to one embodiment. At 702 the process receives a pad voltage at a pad of an integrated circuit. At 704 the process 700 generates a max voltage signal that is the pad voltage if the pad voltage is higher than a supply voltage of the integrated circuit. At 706 the process 700 supplies the max voltage signal to a gate terminal of a first PMOS transistor coupled to the pad if the pad voltage is higher than the supply voltage.

FIG. 8 is a flowchart of a process 800 for protecting an integrated circuit, according to one embodiment. At 802 the process generates a trigger signal indicating an overvoltage event at a pad of an integrated circuit. At 804 the process 800 generates a max voltage signal corresponding to a greater of the pad voltage and the supply voltage. At 806 the process 800 disables a PMOS transistor coupled to the pad by providing the max voltage signal to a gate terminal of the PMOS transistor responsive to the trigger signal The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a voltage generator that includes:
a first transistor that includes a gate coupled to a pad voltage, a first terminal coupled to a supply voltage, and a second terminal;
a second transistor that includes a gate coupled to the supply voltage, a first terminal to the pad voltage, and a second terminal coupled to the second terminal of the first transistor at a first node;
a third transistor that includes a gate coupled to the first node, a first terminal coupled to the first node, and a second terminal coupled to the supply voltage.

2. The device of claim 1 wherein the first transistor is PMOS, the second transistor is PMOS, and the third transistor is PMOS.

3. The device of claim 1, comprising a gate shutoff circuit coupled to the voltage generator.

4. The device of claim 3 wherein the gate shutoff circuit includes:
a fourth transistor coupled to the first node;
a fifth transistor coupled to the fourth transistor; and
a sixth transistor coupled to the fourth and fifth transistors.

5. The device of claim 4 wherein the fourth transistor includes a gate coupled to a trigger signal, a first terminal coupled to the first node, and a second terminal is coupled to a second node.

6. The device of claim 5 wherein the fifth transistor includes a gate coupled to the second node, a first terminal coupled to the first node, and a second terminal coupled to a gate shutoff signal.

7. The device of claim 6 wherein the sixth transistor includes a gate coupled to the trigger signal and a first terminal coupled to the second node.

8. A device, comprising:
a gate shutoff circuit that includes:
a first transistor that is coupled to a trigger signal and a max voltage;
a second transistor that is coupled to the first transistor at a first node, the second transistor is coupled to the max voltage; and
a third transistor is coupled to the first node and the trigger signal.

9. The device of claim 8 wherein the first transistor is PMOS, the second transistor is PMOS, and the third transistor is NMOS.

10. The device of claim 8 wherein the first transistor includes a gate coupled to the trigger signal, a first terminal coupled to the max voltage, and a second terminal coupled to the first node.

11. The device of claim 10 wherein the second transistor includes a gate coupled to the trigger signal, a first terminal coupled to the first node, and a second terminal coupled to ground.

12. The device of claim 11 wherein the third transistor includes a gate coupled to the first node and a first terminal coupled to the max voltage.

13. The device of claim 12, comprising a voltage generator that includes:
   a fourth transistor that includes a gate coupled to a pad voltage, a first terminal coupled to a supply voltage, and a second terminal;
   a fifth transistor that includes a gate coupled to the supply voltage, a first terminal to the pad voltage, and a second terminal coupled to the second terminal of the fourth transistor at a second node;
   a sixth transistor that includes a gate coupled to the second node, a first terminal coupled to the second node, and a second terminal coupled to the supply voltage.

14. The device of claim 13 wherein the fourth transistor is PMOS, the fifth transistor is PMOS, and the sixth transistor is PMOS.

15. A device, comprising:
   a voltage generator that includes:
      a first transistor that is coupled to a pad voltage and a supply voltage;
      a second transistor that is coupled to the first transistor at a first node, the second transistor is coupled to the pad voltage and the supply voltage; and
      a third transistor that is coupled to the first node and the supply voltage;
   a gate shutoff circuit coupled to the voltage generator, the gate shutoff circuit that includes:
      a fourth transistor is coupled to the third transistor and a trigger signal;
      a fifth transistor is coupled to the fourth transistor at a second node, the fifth transistor is coupled to the trigger signal; and
      a sixth transistor coupled to the second node and to the third transistor.

16. The device of claim 15 wherein the first transistor is PMOS, the second transistor is PMOS, and the third transistor is PMOS.

17. The device of claim 16 wherein the fourth transistor is PMOS, the fifth transistor is NMOS, and the sixth transistor is PMOS.

* * * * *